United States Patent

[11] 3,537,553

| [72] | Inventor | Howard E. Olsen<br>Plymouth, Michigan |
|---|---|---|
| [21] | Appl. No. | 790,823 |
| [22] | Filed | Jan. 13, 1969 |
| [45] | Patented | Nov. 3, 1970 |
| [73] | Assignee | General Motors Corporation<br>Detroit, Michigan<br>a corporation of Delaware |

[54] POWER TRAIN INCLUDING A TORQUE-PRESSURE TRANSDUCER
10 Claims, 8 Drawing Figs.

[52] U.S. Cl. .................................................. 192/3.33,
74/731, 251/253
[51] Int. Cl. .................................................. F16d 39/00
[50] Field of Search .......................................... 192/3.33,
56(F), .034; 74/731

[56] References Cited
UNITED STATES PATENTS

| 2,337,748 | 12/1943 | Gsching | 74/731 |
| 2,642,971 | 6/1953 | Hagenbook | 192/56(F)UX |
| 3,237,734 | 3/1966 | Jania | 192/56X |
| 3,384,209 | 5/1968 | Murphy | 192/3.33 |
| 3,416,393 | 12/1968 | Hattori | 74/731 |

*Primary Examiner*—Benjamin W. Wyche, III
*Attorneys*—E. W. Christen, A. M. Heiter and John P. Moran ABSTRACT: A power train including a torque-pressure transducer for an automatic transmission having a converter pump, a converter-driven member or turbine, a hollow turbine shaft fixed at one end thereof for rotation with the turbine and restrained at the other or output end thereof by virtue of being connected to drive a forward clutch assembly, a shaft slip-fitted into the turbine shaft and secured at the one end thereof, the other or output end thereof being free to rotate relative to the restrained end of the turbine shaft, a sleeve including arcuate slots secured to the turbine shaft adjacent longitudinal slots formed in the free end of the inner shaft, a pin mounted in the arcuate and longitudinal slots for axial movement during twisting of the turbine shaft, a valve mounted in the inner shaft and biased by a spring mounted between the valve and the pin to produce a fluid pressure signal representative of the twist and, hence, representative of the input torque on the turbine shaft.

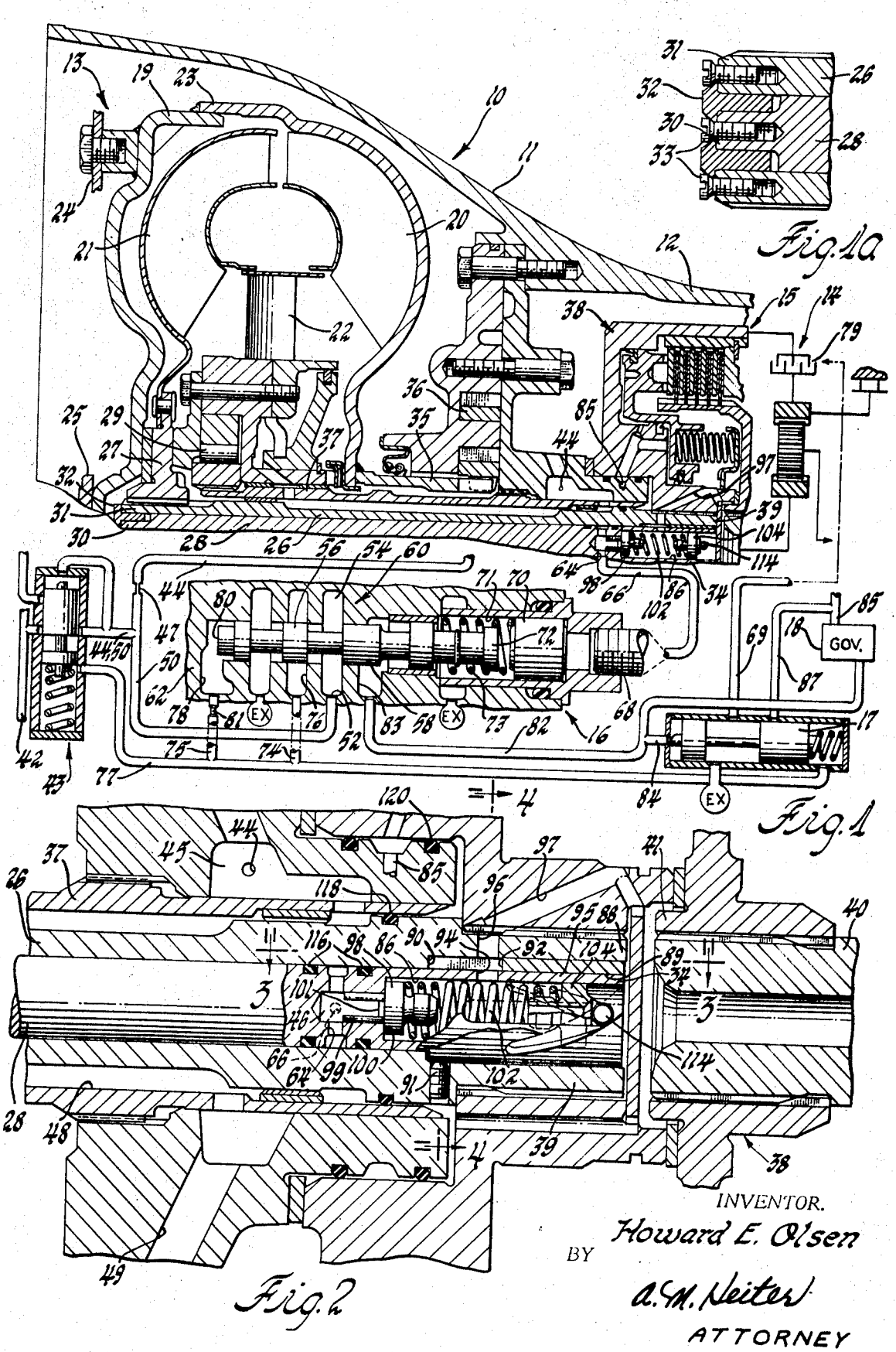

Patented Nov. 3, 1970

3,537,553

INVENTOR.
Howard E. Olsen
BY
A. M. Heiter
ATTORNEY

POWER TRAIN INCLUDING A TORQUE-PRESSURE TRANSDUCER

This invention relates generally to automatic transmissions for motor vehicles and more particularly to a novel means for measuring the torque involved therein.

Heretofore it has been a common practice to communicate manifold pressure or engine vacuum from the engine through a line to a vacuum modulator valve in order to influence the fluid pressure being delivered to the 1-2 and 2-3 shift valves of an automatic transmission in accordance with torque demand. While this is proper for most power trains, it is sometimes deemed desirable to utilize a signal which is more accurately representative of the actual torque being transmitted.

Accordingly, a primary object of the invention is to provide a novel means to produce a pressure signal which accurately represents a converter's output torque to an automatic transmission.

Another object of the invention is to provide a dual shaft arrangement wherein one of the shafts, namely, the turbine shaft, is secured at its input end to the converter-driven member or turbine and is restrained at its output end by a connection with the forward clutch assembly, and the other shaft thereof is secured at one end to the input end of the turbine shaft and has its other end free to rotate relative to the restrained end of the turbine shaft, the relative movement therebetween being directly proportional to torque.

A further object of the invention is to incorporate a valve arrangement in conjunction with the dual shaft arrangement in order that the relative physical movements of the two shafts may be converted into a fluid pressure signal representative of shaft twist or torque.

These and other objects of the invention will become more apparent when reference is made to the following specification and accompanying drawings wherein:

FIG. 1 is a fragmentary cross-sectional view of a torque converter of an automatic transmission power train;

FIG. 1a is a fragmentary cross-sectional view of a portion of FIG. 1;

FIG. 2 is an enlarged cross-sectional view of a portion of FIG. 1;

Figure 6:
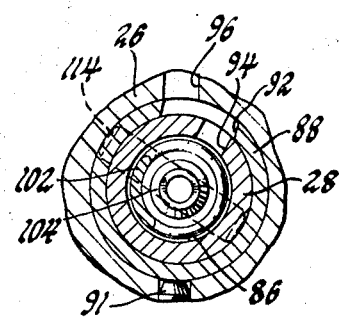
Figure 7:
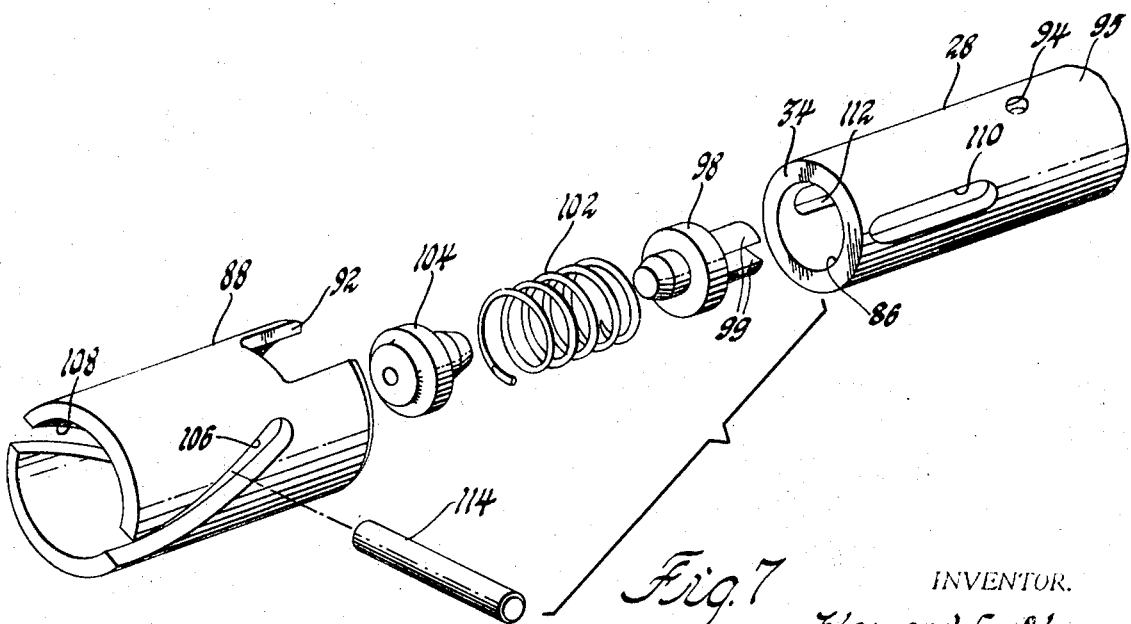

FIGS. 3—6 are cross-sectional views which illustrate a portion of FIG. 2 in various operating positions; and FIG. 7 is a perspective view of a portion of FIG. 2 in a disassembled condition.

Referring to the drawings in greater detail, FIG. 1 illustrates a power train 10 including a transmission 11 having a fixed housing 12, a torque converter assembly 13, a planetary gear system 14, a one-way clutch 15, a modulator assembly 16, a shift valve 17 and a governor 18. The converter assembly 13 includes a cover or drum 19 adjacent a converter pump 20, a turbine 21 and a stator or reactor 22 mounted therein. The drum 19 is welded to the pump 20 to form the sealed torque converter housing 23 which is driven by a conventional flexplate 24 which is fixedly secured to the housing 12 and the engine crankshaft (not shown). The cylindrical plate member 25 is welded to the drum 19 to form a pilot bearing which fits into the conventional end bore of the crankshaft. A hollow turbine shaft 26 is splined to a hub 27 of the turbine 21. An inner transducer shaft 28 is secured at the input end 30 thereof to the input end 31 of the shaft 26 by any suitable means, such as a cap 32 and bolts 33 (FIG. 1a), and is otherwise slip-fitted within the hollow shaft 26, the output end 34 of the transducer shaft 28 being free to turn therein with respect to the turbine shaft 26.

The converter pump 20 is connected by a sleeve 35 to drive a transmission pump 36 which thereupon supplies oil to the converter pump 20 via a passageway (not shown). The return line is via an annular passage 48 and a return passage 49 (FIG. 2). The variable pitch stator 22 is connected by a one-way brake 29 and a ground sleeve 37 to the fixed housing 12. A forward clutch assembly 38 is splined to the output end 39 of the turbine shaft 26, and a mainshaft 40 is splined to the forward clutch hub 41.

The pump 36 additionally supplies oil from a sump in the housing 12 via a pump discharge line 42, a pressure regulator 43, a transducer pressure line 44, a changer 45 to a chamber 46 formed in the inner shaft 28. A feed orifice or restriction 47 is formed on the transducer pressure line 44. The pump 36 also supplies oil at line pressure from the housing 12 through a modulator line 50 and a port 52 to a chamber 54 between lands 56 and 58 of a regulator valve 60 mounted in a valve housing 62. Outlet ports 64 and annular groove 65 formed in the inner shaft 28, and a transducer pressure passage 66 communicate between the chamber 46 and an axially aligned inlet port 68 leading into a chamber 71 formed in the housing 62 of the modulator assembly 16.

A plug 70 is slidably mounted in a chamber 71 adjacent the right-hand end 72 of the valve 60. A spring 73 is mounted in the chamber 71 urging the plug 70 away from the end 72. A line 74 communicates between a regulating chamber 76 and a modulator line 77 leading to the pressure regulator 43. A branch line 75 communicates between the line 77 and a second regulating chamber 78, the chambers 76 and 78 being located adjacent the land 56 and the leftward (FIG. 1) end 80 of the valve 60, respectively. A damping orifice 81 is included in the branch line 75 adjacent the chamber 78. The line 77 further communicates between the line 74 and a typical shift valve 17. Still another line 82 communicates between a chamber 83 adjacent the land 58 of the regulator valve 60 and the usual governor 18, with a branch line 84 leading from the line 82 to the shift valve 17, the lines 77, 82 and 84 serving to transfer torque indicative fluid to the shift valve to control the point at which the shift valve 17 operates. Another line 85 communicates between the governor 18 and the clutch assembly 38, while a line 87 communicates between the shift valve 17 and the line 85. Still another line 69 communicates between the shift valve 17 and the usual band 79.

Figure 3:
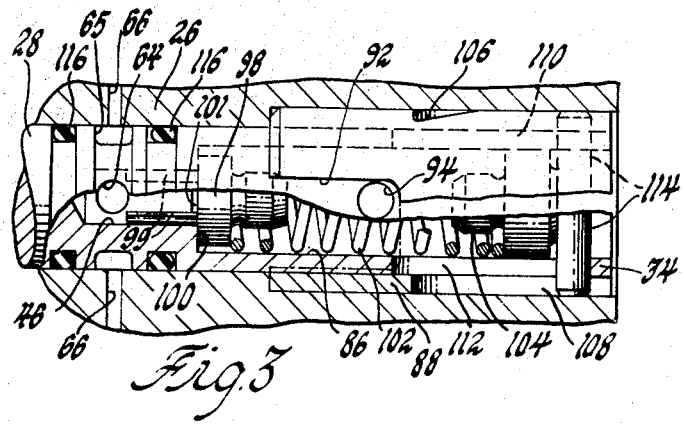
Figure 4:
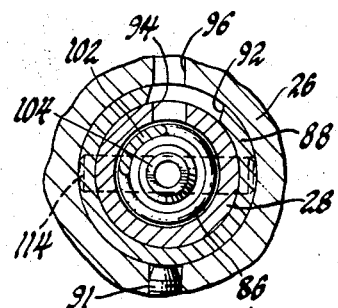
Figure 5:
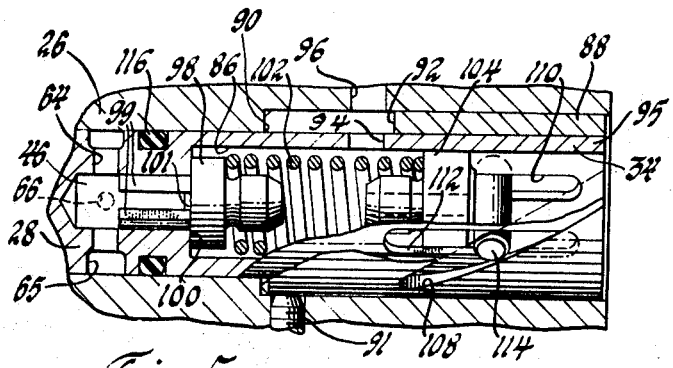

A second chamber 86 aligned with and larger in diameter than the chamber 46 is formed in the inner shaft 28. As better seen in FIGS. 2—7, a sleeve 88 fits around the inner shaft 28 at the output end 34 thereof in a counterbore 89 and abuts a shoulder 90 formed in the turbine shaft 26 and is secured for rotation with the outer turbine shaft 26 by any suitable means, such as a setscrew 91. A rectangular opening 92 (FIG. 7) in the sleeve 88 is large enough to at all times communicate between an opening 94 formed through the wall 95 adjacent the larger diameter passage 86 and an outlet port 96 formed through the wall of the turbine shaft 26, regardless of the relative positions of ports 94 and 96 (FIGS. 4 and 6). The port 96 communicates with an exhaust passage 97 formed in the clutch assembly 38, the passage 97 being connected to the pump 36. A valve 98 is biased with respect to the abutment 100 between the aligned chambers 46 and 86 by a spring 102, the spring 102 being mounted between the valve 98 and a slidably movable spring retainer 104.

The valve 98 includes extending fingers 99 which are inserted in the chamber 46, and a projection 101 which also extends into the chamber 46 when the valve body 98 abuts against the abutment 100. The valve 98 must move away from the abutment 100 a distance corresponding to the height of the projection 101 before fluid in the chamber 46 will communicate with the chamber 86.

As illustrated in FIG. 7, the sleeve 88 further includes a pair of oppositely disposed arcuate grooves 106 and 108, each curving in a clockwise direction, as seen in FIG. 7. The output end 34 of the shaft 28 includes a pair of oppositely disposed longitudinal slots 110 and 112 which cooperate with the arcuate grooves 106 and 108 of the sleeve 88 when a pin 114 is inserted therethrough. Once in place, the pin 114 abuts against the end of the spring retainer 104.

As illustrated in FIG. 2, suitable O-ring seals 116, 118 and 120 are mounted in grooves formed in the shafts 28 and 26 and adjacent the forward clutch assembly 38, respectively.

OPERATION

As is well known, the converter-driven member or turbine 21 is driven by the force of oil imparted thereto by the converter pump 20, the pump 20 being connected for rotation with the engine crankshaft (not shown) by the flex-plate 24 and being supplied with oil by the transmission pump 36 which it drives via the sleeve 35. The turbine 21, through the hub 27, the latter being splined to the turbine shaft 26, drives the shaft 26. The shaft 26, in turn, drives the forward clutch assembly 38, which, when engaged, drives the mainshaft 40 in the usual manner.

The input end 30 of the inner shaft 28, being secured to the end 31 of the turbine shaft 26 through the end cap 32 and bolts 33 (FIG. 1a), is caused to rotate with the shaft 26. The output end 34 of the inner shaft 28, being free of the output end 39 of the turbine shaft 26, will rotate independently of the shaft 26. Hence, when the latter shaft 26 is restrained by virtue of the connection with the clutch assembly 38, the torque being transmitted therethrough will be reflected by the relative rotation of the free output end 34 of the unloaded inner shaft 28.

A pressure signal representative of the torque is produced by measuring the relative motion of the ends 39 and 34 of the shafts 26 and 28, respectively, and converting that measurement into a fluid pressure signal. This is in part accomplished by the pin 114 being mounted through the longitudinal grooves or slots 110 and 112 of the inner shaft 28 and the arcuate grooves 106 and 108 of the sleeve 88 which is secured to the outer turbine shaft 26 by the setscrew 91. It is apparent that, as the end 34 of the inner shaft 28 moves relative to the restrained end 39 of the turbine shaft 26, under increased load on the turbine shaft 26, the pin 114 will be forced to follow the variable aligned open portions of the grooves or slots 106, 108, 110 and 112 (FIGS. 3—6). Since the radial alignment of the longitudinal and arcuate grooves will change, the pin 114 will travel leftward in FIGS. 1, 2, 3 and 5, along the ramps formed by the edges of the arcuate grooves 106 and 108, thereby compressing the spring 102 and increasing its bias on the projection portion 101 of the valve 98, and thereby regulating the flow from the chamber 46 into the chamber 86. The series of orifices 47 and 46/86 form a "feed and bleed" regulating system, minimizing the flow of fluid through the system. The variable orifice between the chambers 46 and 86 regulates the fluid bled off therepast from the passage 44, the chamber 45 and the chamber 46 into the chamber 86 and thence through the openings 94, 92 and 96 to the exhaust passage 97.

Accordingly, the transducer pressure in the chamber 46 and in the passages 64 and 66 will increase in response to any increased force on the valve 98 by the spring 102 caused by leftward movement of the pin 114 and the retainer 104, resulting in leftward movement of the plug 70 in the chamber 71 into contact with the end 72 of the regulating valve 60, against the force of the spring 73. The valve 60 will correspondingly regulate the fluid entering the chamber 54 between the lands 56 and 58 and exiting therefrom into the chamber 76 and thence to the lines 74 and 77 and the branch line 75. Fluid in the branch line 75 is fed past the dampening restriction 81 into the chamber 78 adjacent the end 80 of the valve 60, the regulating balance thereon being represented by the equation $P_{70} \times A_{70} = P_{80} \times A_{80}$, where $P_{70}$ is the leftward pressure on the plug 70, $A_{70}$ is the area of the plug 70, $P_{80}$ is the rightward pressure on the valve 60, and $A_{80}$ is the area of the end 80 of the valve 60. The result of the above is that the pressure of the fluid in the line 77 is proportional to torque, as determined by measurement of the twist of the turbine shaft 26 relative to the inner shaft 28.

The modulated or torque-influenced pressure in the line 77 will be directed to the usual 1–2 and/or 2–3 shift valves 17, to apply a force thereon which is reflective of torque, in lieu of the usual engine vacuum responsive signal heretofore applied to shift valves.

It should be noted that the external circuit including the follower modulator valve assembly 16 is primarily used for fluid conservation. By employing a somewhat greater volume of fluid, it would be possible to have the port 64 and the line 66 communicate the torque-pressure signal directly to line 77, and eliminate the valve assembly 16 altogether.

It should be apparent that the invention embodies a novel means for more accurately measuring a converter's output torque to the transmission than has heretofore been the case.

It should also be apparent that the invention eliminates the prior need to direct an engine vacuum signal to a vacuum modulator valve and thence to the shift valves in order to approximate the torque output.

While but one embodiment of the invention has been shown and described, it should be apparent that other modifications thereof are possible.

I claim:

1. A power train comprising a transmission including a torque converter, a clutch, a source of fluid under pressure, a mainshaft, a turbine shaft operatively connected between said torque converter and said clutch for driving said mainshaft when said clutch is engaged, and a second shaft secured at one end thereof to the input end of said turbine shaft and free at the other end thereof to rotate relative to the output end of said turbine shaft restrained by said clutch; a shift valve; a governor operatively connected to said shift valve; means operatively connected to said turbine shaft and said second shaft for converting the relative movements of said restrained end of said turbine shaft and said free end of said second shaft into a fluid pressure signal representative of torque; and passage means for communicating said fluid pressure torque signal to said shift valve for controlling the point at which said shift valve operates.

2. The power train described in claim 1, wherein said turbine shaft is hollow and said second shaft is slip-fitted into said turbine shaft.

3. The power train described in claim 1, wherein said converting means includes a chamber formed in said second shaft, means associated with said turbine shaft and said second shaft for measuring the relative restrained and unrestrained movements of said shafts, and valve means responsive to said measuring means for controlling a bleed orifice to produce said fluid pressure signal representative of said relative movements.

4. The power train described in claim 3, wherein said measuring means includes a pair of arcuate grooves formed in said turbine shaft, a pair on longitudinal grooves formed in said second shaft, a pin mounted in said arcuate and longitudinal grooves, a spring retainer axially movable by said pin, and a spring mounted between said spring retainer and said valve means, said valve means being responsive to the movement of said spring retainer through said spring.

5. The power train described in claim 1, and an external regulating valve operatively connected to said converting means and responsive to said fluid pressure signal for conserving fluid while transferring said fluid pressure signal.

6. A torque-pressure transducer for use with a power train including a torque converter, a clutch, a source of fluid under pressure, a mainshaft, and a hollow turbine shaft operatively connected between said torque converter and said clutch for driving said mainshaft when said clutch is engaged, said torque-pressure transducer comprising a shaft mounted in said hollow turbine shaft and fixedly secured to one end thereof, a chamber formed in the free end of said second-mentioned shaft, means operatively connected between said turbine shaft and said second-mentioned shaft and axially movable in said chamber in proportion to the relative twist between said shafts, an inlet into said chamber for said fluid under pressure, a bleed orifice formed in said chamber, and valve means mounted in said chamber and operatively connected to said axially movable means for controlling said bleed orifice, said valve means being responsive to movement of said axially movable means.

7. The torque-pressure transducer described in claim 6, wherein said axially movable means includes a pair of arcuate grooves formed in said turbine shaft, a pair of longitudinal grooves formed in said second-mentioned shaft, a pin mounted in said arcuate and longitudinal grooves, a spring retainer axially movable by said pin, and a spring mounted between said spring retainer and said valve means, said valve means being responsive to the movement of said spring retainer through said spring.

8. The torque-pressure transducer described in claim 7, and a sleeve fixedly secured to said turbine shaft around the free end of said second-mentioned shaft, said arcuate grooves being formed in said sleeve.

9. The torque-pressure transducer described in claim 6, and an external regulating valve responsive to the pressure of said fluid resulting from the control of said bleed orifice by said valve means for regulating the pressure of said fluid from said source in accordance with said relative twist between said shafts.

10. A torque-pressure transducer for use with a power train including a torque converter, a clutch, a source of fluid under pressure, a mainshaft, and a hollow turbine shaft operatively connected between said torque converter and said clutch for driving said mainshaft when said clutch is engaged, said torque-pressure transducer comprising a shaft mounted in said hollow turbine shaft and fixedly secured to one end thereof, a chamber formed in the free end of said second-mentioned shaft, first groove means formed on said turbine shaft, second groove means formed on said second-mentioned shaft, said first and second groove means having one end of each thereof aligned and the other ends thereof radially displaced from one another, pin means mounted in said grooves and in said chamber and movable along said first and second groove means in response to the twisting movement of one of said shafts, an inlet into said chamber for said fluid under pressure, a bleed orifice formed in said chamber, valve means positioned adjacent said bleed orifice in said chamber for controlling said bleed orifice, and spring means mounted between said valve means and said pin means, said valve means being responsive to the biasing action resulting from the compression of said spring means by said pin means.